United States Patent [19]

Sasaki et al.

[11] Patent Number: 5,144,550
[45] Date of Patent: Sep. 1, 1992

[54] TEST RUN CONTROL METHOD

[75] Inventors: Takao Sasaki, Hachioji; Kunihiko Murakami, Hino; Masafumi Sano, Minamitsuru, all of Japan

[73] Assignee: Fanuc Ltd., Yamanashi, Japan

[21] Appl. No.: 582,203

[22] PCT Filed: Feb. 9, 1990

[86] PCT No.: PCT/JP90/00169
§ 371 Date: Oct. 1, 1990
§ 102(e) Date: Oct. 1, 1990

[87] PCT Pub. No.: WO90/10263
PCT Pub. Date: Sep. 7, 1990

[30] Foreign Application Priority Data

Feb. 22, 1989 [JP] Japan .................. 1-42428

[51] Int. Cl.$^5$ ............... G05B 19/405; G05B 19/403
[52] U.S. Cl. .................. 364/192; 364/474.01; 364/474.22
[58] Field of Search .......... 364/191, 192, 474.01, 364/474.22; 371/19

[56] References Cited
U.S. PATENT DOCUMENTS

| | | | |
|---|---|---|---|
| 4,531,182 | 7/1985 | Hyatt | 364/131 |
| 4,891,763 | 1/1990 | Kuriyama | 364/192 |
| 5,029,329 | 7/1991 | Miyajima | 364/474.01 |
| 5,051,676 | 9/1991 | Seki et al. | 364/191 |

Primary Examiner—Jerry Smith
Assistant Examiner—Paul Gordon
Attorney, Agent, or Firm—Staas & Halsey

[57] ABSTRACT

A test run control method tests a computerized numerical control (CNC) apparatus to check a generated NC program. Data are read block by block from an NC program in response to a test run start command (ST1), the data are converted into execution blocks while forwarding a tool in a forward travel, and the data in the form of execution blocks and model data necessary for a preliminary processing are stored in a reverse function memory. The tool is reversed in a reverse travel based on the data in the form of execution blocks stored in the reverse function memory in response to a reverse command (ST2). The reverse travel is stopped at a given time (P11) in response to a stop command (ST3) to allow the NC program to be edited in a prescribed range. The program is editged in the prescribed range (N112) with an editing function. The preliminary processing is effected on the basis of the modal data stored in the reverse function memory in response to a test run restart command (ST5), and the edited NC program is executed. With the above method, the NC program can be checked and modified in a simple operation.

6 Claims, 6 Drawing Sheets

TEST RUN CONTROL METHOD

DESCRIPTION

1. Technical Field

The present invention relates to a test run control method for testing a computerized numerical control (CNC) apparatus to check an NC program run thereby, and more particularly to a test run control method which can simplify a test run process and edit the NC program while a reverse function is being performed.

2. Background Art

Generally, a newly generated NC program is registered in a memory of a computerized numerical control (CNC) apparatus, and thereafter checked for errors by a test run. If the NC program is to be modified, the tool is returned to a certain position by a reverse function, for example, the test run is interrupted, and then the operation of the computerized numerical control apparatus is shifted from a memory mode to an edit mode. The reverse function is a function by which the tool is returned from the present position along the path which has been followed by the tool so far, the reverse function being initiated by a reverse command signal (reverse travel). When the reverse command signal is removed, the tool resume machining the workpiece from the position to which the tool has returned (re-forward travel).

If the NC program is modified in the edit mode, since modal data for effecting a preliminary processing are varied, the test run has to be started again from several blocks before the block where the test run has been interrupted or from the first block.

DISCLOSURE OF THE INVENTION

The present invention has been made in view of the aforesaid drawbacks. It is an object of the present invention to provide a test run control method which simplifies a test run process and allows an NC program to be edited while a reverse function is being performed.

To achieve the above object, there is provided in accordance with the present invention a test run control method for testing a computerized numerical control (CNC) apparatus to check a generated NC program, comprising the steps of reading data block by block from an NC program in response to a test run start command, converting the data into execution blocks while forwarding a tool in a forward travel, and storing the data in the form of execution blocks and modal data necessary for a preliminary processing in a reverse function memory, reversing the tool in a reverse travel based on the data in the form of execution blocks stored in the reverse function memory in response to a reverse command, stopping the reverse travel at a given time in response to a stop command to allow the NC program to be edited in a prescribed range, editing the program in the prescribed range with editing means, and effecting the preliminary processing based on the modal data stored in the reverse function memory in response to a test run restart command, and executing the edited NC program.

During the forward travel, the data in the form of execution blocks and the modal data necessary for the preliminary processing are stored in the reverse function memory, and the reverse or re-forward travel is carried out on the basis of the stored data.

When the stop command is issued, the execution of the NC program is stopped at a certain time. The operator effects an editing operation to edit the NC program only in the range of blocks for which the data in the form of execution blocks and the modal data are stored in the reverse function memory. The edited NC program starts being executed, on the basis of the modal data, from the position in which the execution of the NC program has been stopped.

BEST MODE FOR CARRYING OUT THE INVENTION

An embodiment of the present invention will hereinafter be described with reference to the drawings.

Figure 1A:
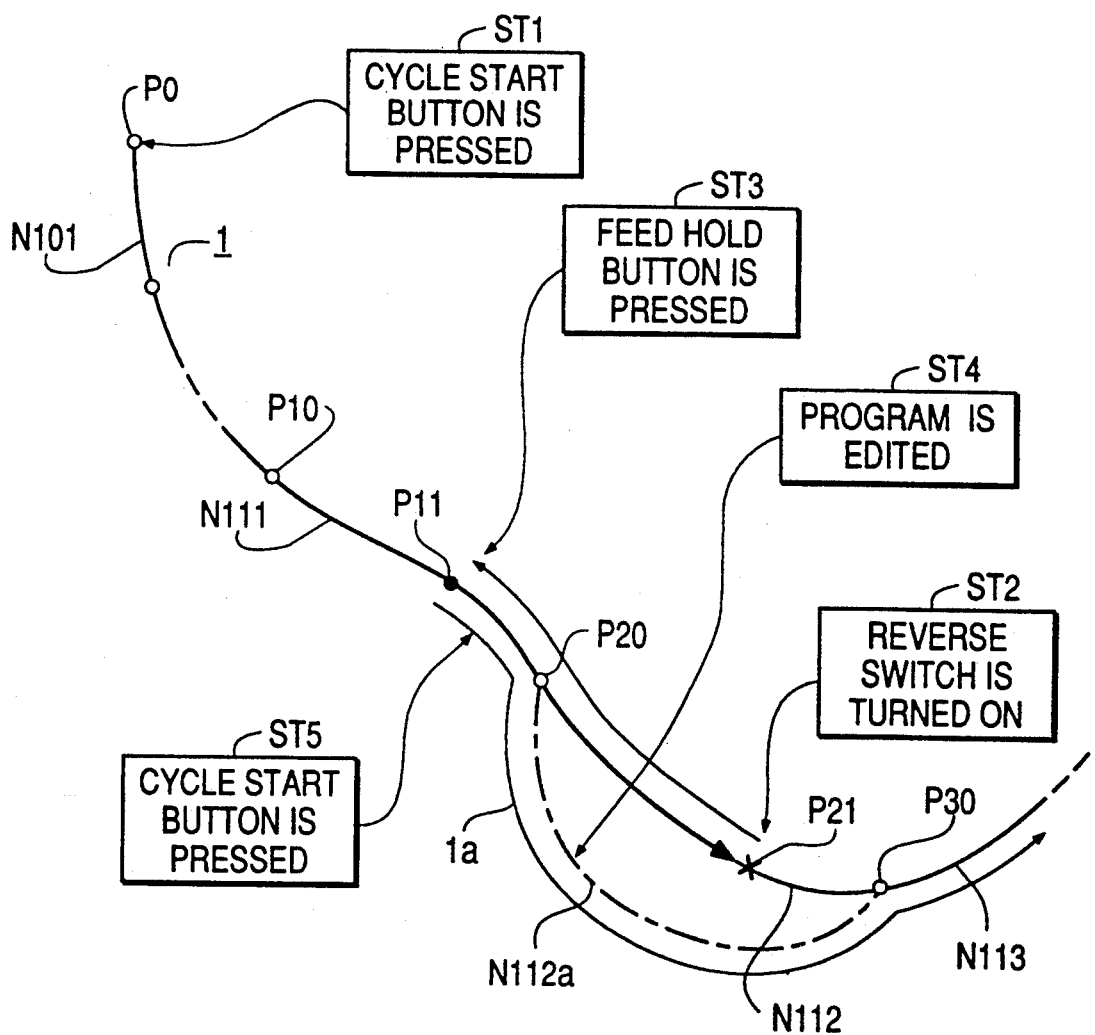
FIG. 1(a) is a view illustrative of a test run control method according to the present invention.

FIG. 1(a) illustrates a test run control method according to the present invention. In FIG. 1(a), when the operator presses a cycle start button (ST1), a computerized numerical control (CNC) apparatus reads an NC program block by block, converts the NC program into data in the form of execution blocks, and move a tool (not shown) along a machining path 1 from a point P0 successively through blocks N101, . . . N111, N112, N113, . . . . At this time, the converted data in the form of execution blocks and modal data are stored in a reverse function memory.

When the operator finds an error in the block N112 and turns on a reverse switch at a point P21 (ST2), the computerized numerical control apparatus returns the tool along the path it has followed so far based on the data in the form of execution blocks which are stored in the reverse function memory.

Upon depression of a feed hold button at a point P11 (ST3), the reverse travel is immediately stopped in the block N111, and a flag is set to allow the next block N112 and following blocks to be edited, so that the program can be edited in the test mode. Although not shown, if a single block switch is turned on at the point P11, the tool keeps returning to a starting point P10 of the block N111 and then stops its reverse travel, after which a flag is set to allow the block N111 and following blocks to be edited. An operation process which is carried out when the reverse switch is turned off during a reverse travel will be described later.

Thereafter, the operator edits the NC program so that the block N112 is modified into a block N112a, for example (ST4). If the operator attempts to edit a block outside of the range in which the program is allowed to be edited, as described above, then an alarm is produced to invalidate the editing attempt.

When the cycle start button is pressed again (ST5), the computerized numerical control apparatus moves the tool along a machining path 1a of the edited NC program.

Figure 1B:
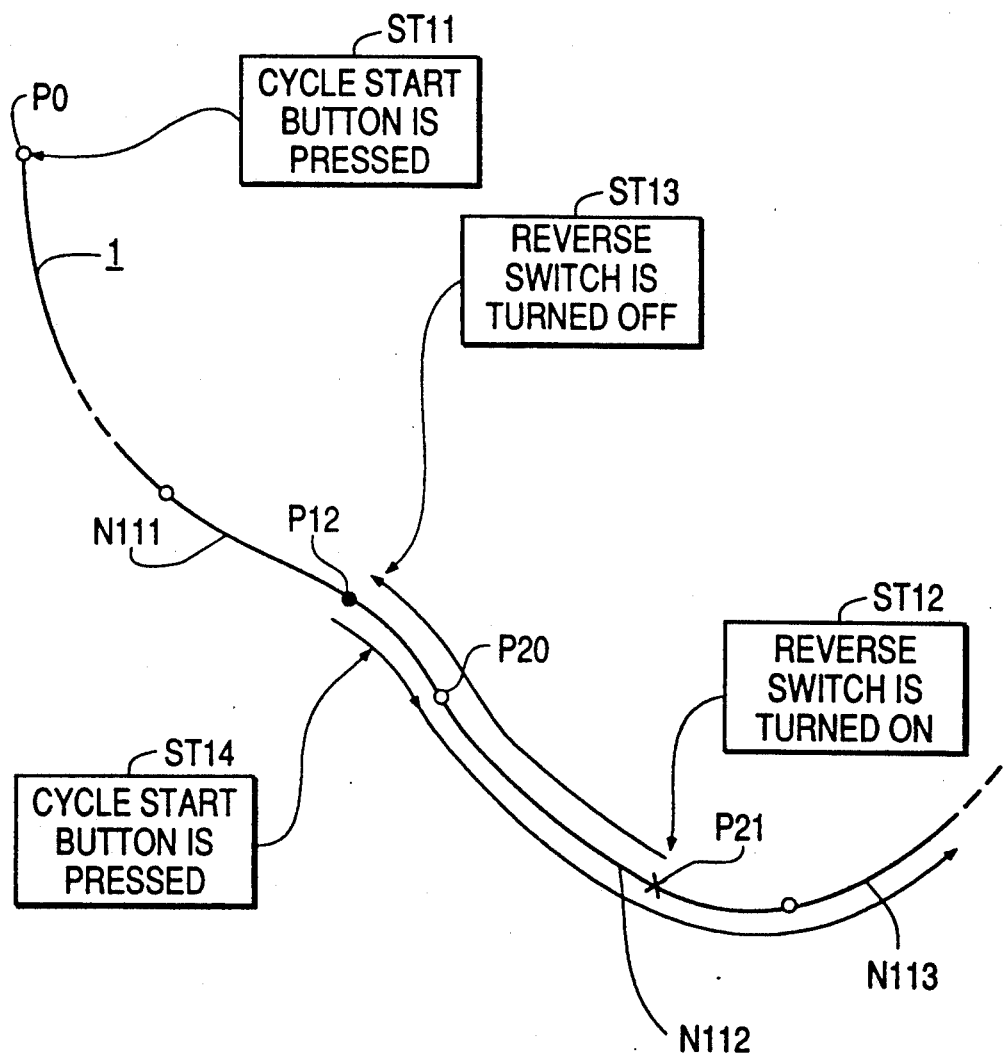
FIG. 1(b) is a view illustrative of the manner in which a reverse switch is turned off during a reverse travel according to the test run control method of the present invention.

FIG. 1(b) is illustrative of the manner in which a reverse switch is turned off during a reverse travel. The tool starts a forward travel when the operator presses the cycle start button (ST11), and starts a reverse travel when the operator turns on the reverse switch at a point P21 (ST12). When the reverse switch is turned off at a point P12 within the block N111 (ST13) and the cycle start switch button is then pressed (ST14), the tool effects a re-forward travel based on the data stored in the reverse function memory up to a starting point P20 of the next block N112. From the block N112 and following blocks, the tool effects a forward travel while a preliminary processing is being carried out on the basis of the modal data stored in the reverse function memory. Although not shown, if the reverse switch is turned off at the starting point P20 of the block N112, the tool makes a forward travel while a preliminary processing is being carried out on the basis of the modal data for the block N112 stored in the reverse function memory.

Figure 1C:
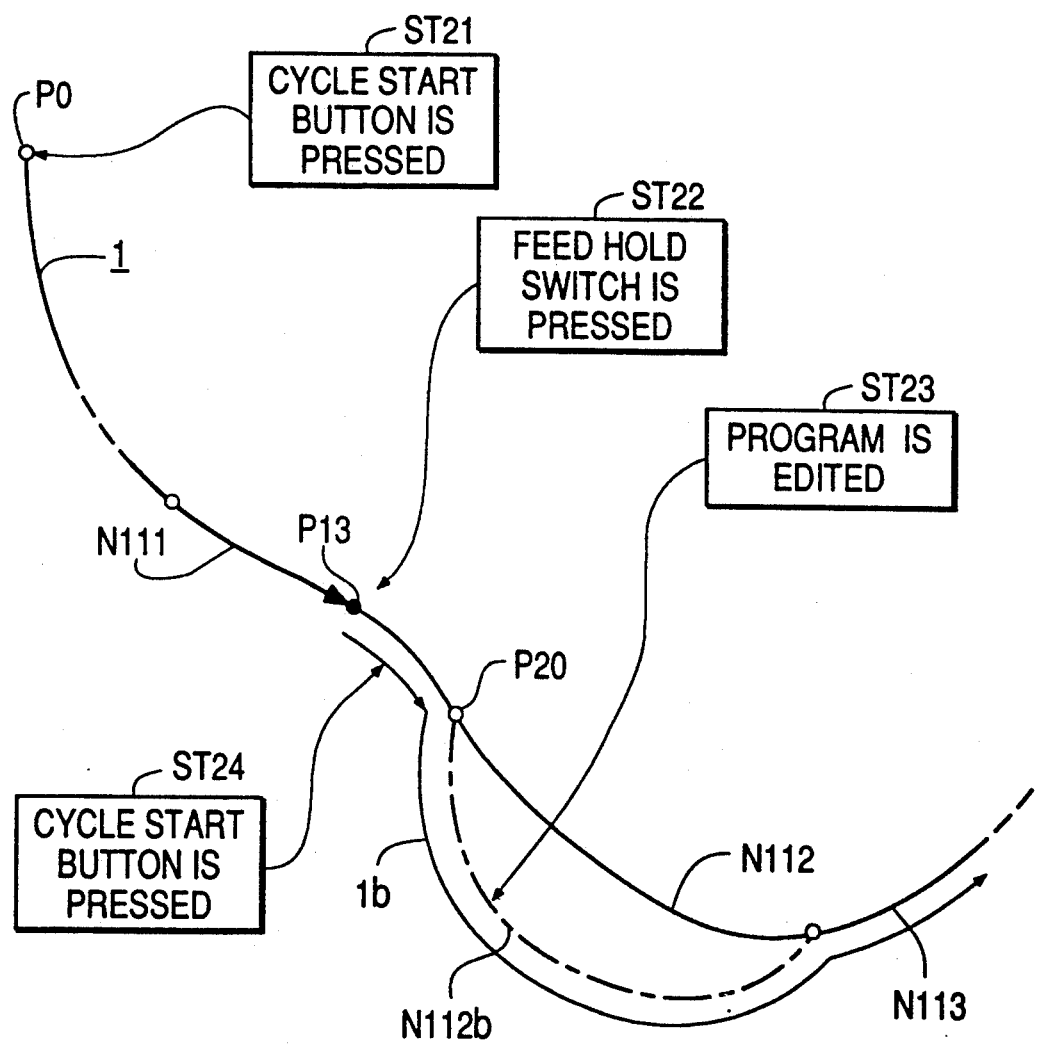
FIG. 1(c) is a view illustrative of an editing process during a forward travel according to the test run control method of the present invention.

An editing process during a forward travel will be described below with reference to FIG. 1(c). In FIG. 1(c), the tool starts a forward travel when the operator presses the cycle start button (ST21). When the feed hold button is pressed at a point P13 of the block N111 (ST22), the tool immediately stops its forward travel, and a flag is set to allow the program to be edited in the block N112 and following blocks. Although not shown, if the single block switch is turned on at the point P13, the tool continues its forward travel up to the starting point P20 of the block N112 and then stops the forward travel, after which a flag is set to allow the program to be edited in the block N112 and following blocks. Thereafter, the operator edits the NC program so that the block N112 is modified into a block N112b, for example (ST23). When the cycle start button is pressed again (ST24), the computerized numerical control apparatus moves the tool along a machining path 1b of the edited NC program.

Figure 2A:
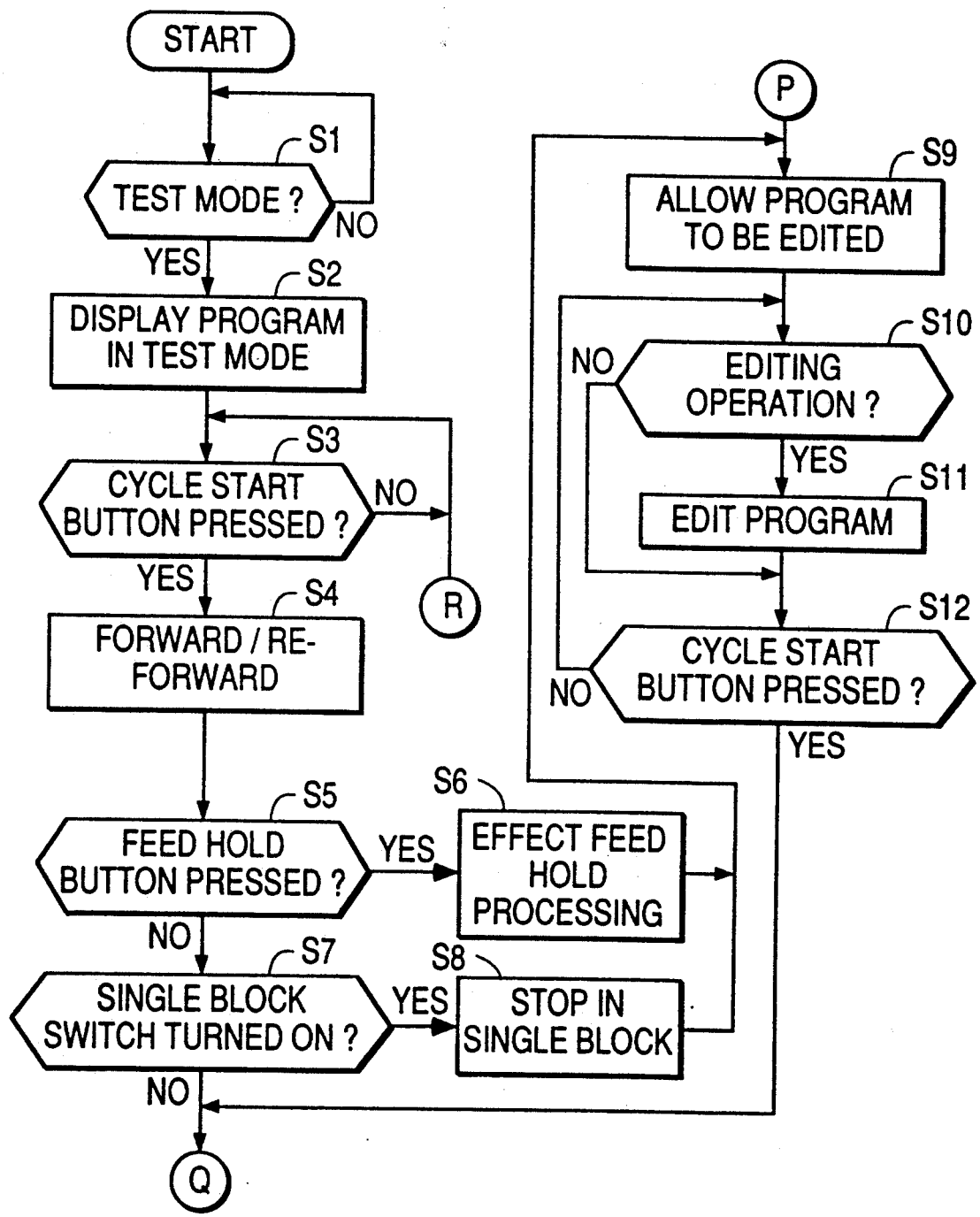
FIGS. 2(a) and 2(b) are a flowchart of a sequence of the test run control method according to the present invention.
Figure 2B:
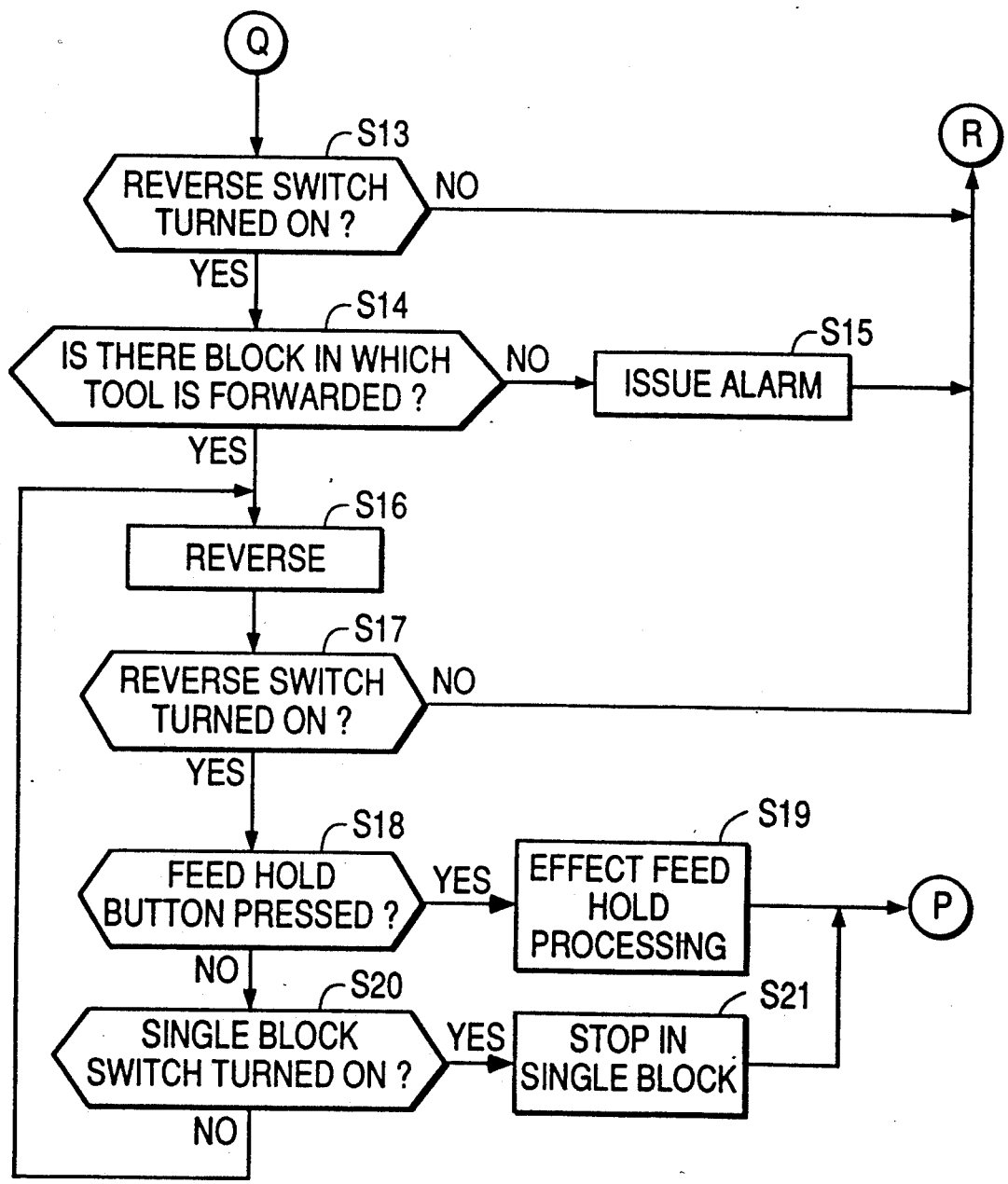

FIGS. 2(a) and 2(b) are a flowchart of a sequence of the test run control method according to the present invention. Those numerical values following the letter S in FIGS. 2(a) and 2(b) indicate step numbers.

[S1] Whether the operation mode is to be changed to a test mode or not is determined depending on the presence or absence of a test signal.

[S2] The program is displayed.

[S3] Whether the cycle start button is pressed or not is determined. If pressed, then control goes to S4.

[S4] Data are read block by block from the NC program and converted into the form of execution blocks, while the tool is effecting a forward travel. The data in the form of execution blocks and modal data necessary for a preliminary processing are stored in the reverse function memory.

[S5] Whether the feed hold button is pressed or not is determined. If pressed, then control goes to S6, and if not, then control goes to S7.

[S6] The forward travel or re-forward travel is immediately stopped. If the present position is in a block, then a flag is set to allow the next block and following blocks to be edited, if the present position is at the starting point of a block, then a flag is set to allow that block and following blocks to be edited.

[S7] Whether the single block switch is turned on or not is determined. If turned on, then control goes to S8, and if not, then control goes to S13.

[S8] The tool effects a forward travel or a re-forward travel up to the starting point of a block following the block in which the single block switch is turned on, and then the tool is stopped. A flag is now set to allow the program to be edited in the block in which the tool is stopped and following blocks.

[S9] A processing is effected to allow the program to be edited in the range designated by the flag.

[S10] Whether an editing operation is effected or not is determined. If effected, then control goes to S11, and if not, then control goes to S12.

[S11] The program is edited.

[S12] Whether the cycle start button is pressed or not is determined. If pressed, then control goes to S13, and if not, then control returns to S10, waiting for an editing operation.

[S13] Whether the reverse switch is turned on or not is determined. If turned on, then control goes to S14, and if not, then control returns to S3.

[S14] Whether there is a block in which the tool has effected a forward travel, or not is determined. If there is, then control goes to S16, and if not, then control goes to S15.

[S15] Since there is no block in which the tool has effected a forward travel, i.e., no data are stored in the reverse function memory, an alarm is issued.

[S16] The tool effects a reverse travel based on the data in the form of execution blocks stored in the reverse function memory.

[S17] Whether the reverse switch is turned on or not is determined. If turned on, then control goes to S18, and if turned off, then control returns to S3.

[S18] Whether the feed hold button is pressed or not is determined. If pressed, then control goes to S19, and if not, then control goes to S20.

[S19] The reverse travel is immediately stopped. If the present position is in a block, then a flag is set to allow the next block and following blocks to be edited, if the present position is at the starting point of a block, then a flag is set to allow that block and following blocks to be edited. Then, control goes back to S9.

[S20] Whether the single block switch is turned on or not is determined. If turned on, then control goes to S21, and if not, then control goes back to S16 to continue the reverse travel.

[S21] The tool effects a reverse travel up to the starting point of the block in which the single block switch is turned on, and then the tool is stopped. A flag is now set to allow the program to be edited in the block in which the tool is stopped and following blocks. Then, control returns to S9.

Figure 3:
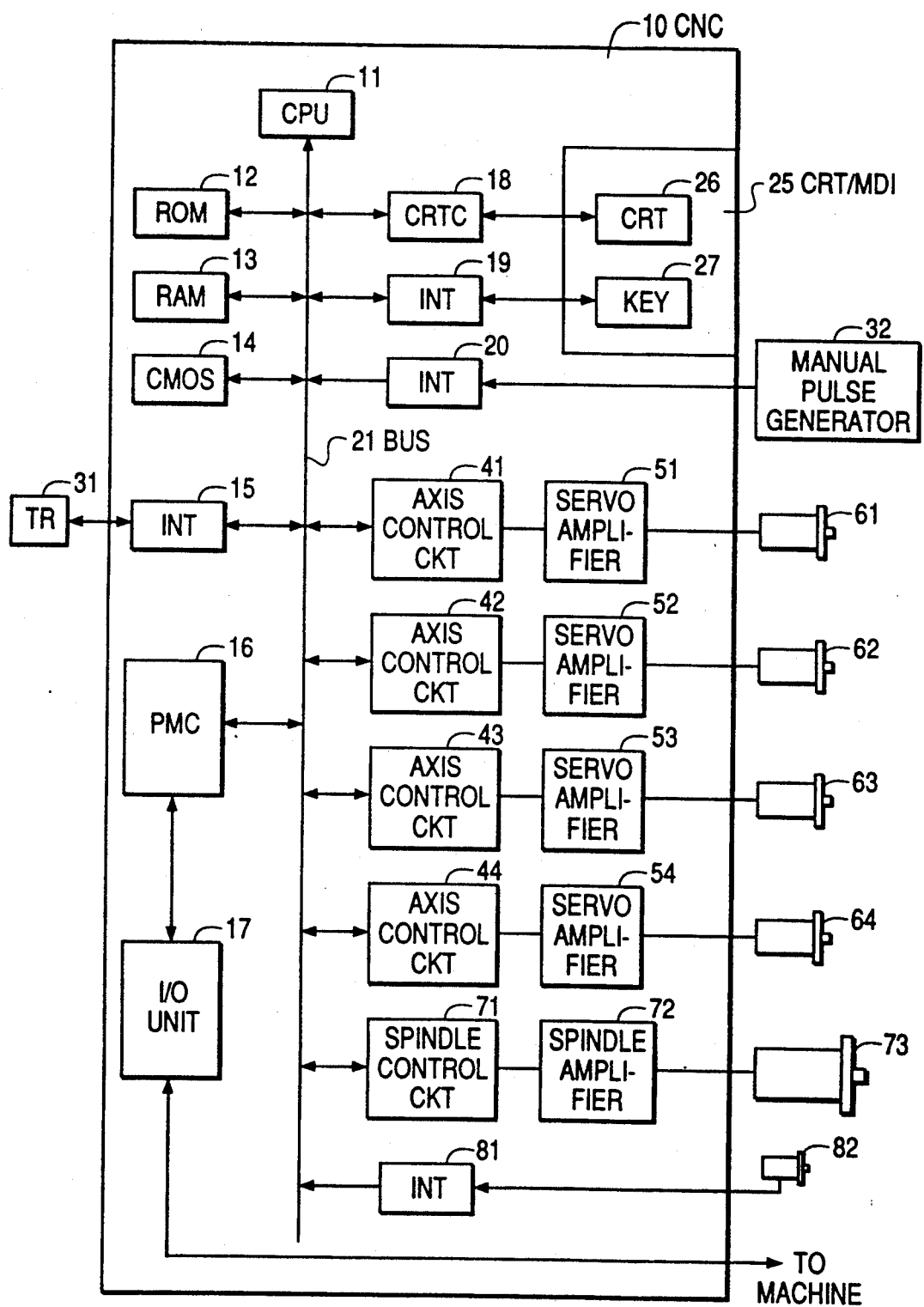
FIG. 3 is a block diagram of the hardware of a computerized numerical control apparatus which carries out the test run control method according to the present invention.

FIG. 3 shows in block form the hardware of a computerized numerical control (CNC) apparatus which carries out the test run control method according to the present invention. Denoted at 10 is a computerized numerical control (CNC) apparatus. The computerized numerical control (CNC) apparatus has a processor 11 for controlling the entire apparatus. The processor 11 reads a system program stored in a ROM 12 through a bus 21, and controls the entire computerized numerical control (CNC) apparatus according to the system program. A RAM 13 stores temporary calculated data, display data, etc. A portion of the RAM 13 is used as the reverse function memory for storing data in the form of execution blocks and modal data. The RAM 13 comprises a DRAM. A CMOS 14 stores tool correcting quantities, pitch error correcting quantities, an NC program, parameters, etc. The CMOS 14 is backed up by a battery (not shown) so that it is nonvolatile even when the power supply of the computerized numerical control (CNC) apparatus is turned off. Therefore, the data stored in the CMOS 14 are retained as they are.

An interface 15 is used for connection to an external device 31 such as a paper tape reader, a paper tape puncher, a paper tape reader/puncher, or the like. A machining program is read from the paper tape reader, and an NC program edited in the computerized numerical control (CNC) apparatus can be output to the paper tape puncher.

The computerized numerical control (CNC) apparatus includes a PMC (programmable machine controller) 16 which controls the machine according to a sequence program that is generated in a ladder form. More specifically, PMC 16 converts M, S, and T functions indicated by a machining program into signals required by the machine according to the sequence program, and outputs these converted signals to the machine through an I/O unit 17. The output signals drive magnets in the machine and operate hydraulic valves, pneumatic valves, and electric actuators. Furthermore, the PMC 16 receives signals from limit switches in the machine and switches on the machine control panel, processes these signals, and transfers the processed signals to the processor 11.

A graphic control circuit 18 converts digital data such as data on the present positions of axes, alarm data, parameters, and image data into image signals, and outputs these image signals. The image signals are transmitted to a display 26 in a CRT/MDI unit 25, and displayed on the display 26. An interface 19 receives data from a keyboard 27 in the CRT/MDI unit 25, and transfers the data to the processor 11.

An interface 20 is connected to a manual pulse generator 32 for receiving pulses from the manual pulse generator 32. The manual pulse generator 32 is mounted on the machine control panel, and is manually operated on to move moving components of the machine.

Axis control circuits 41 through 44 output axis commands to respective servoamplifiers 51 through 54 in response to motion commands for the respective axes from the processor 11. Responsive to the received axis commands, the servoamplifiers 51 through 54 drive servomotors 61 through 64 for the respective axes. The servomotors 61 through 64 are associated with respective position detecting pulse coders therein which feed back position signals as pulse trains. Linear scales may be used as the position detectors. The pulse trains may be subjected to F/V (frequency/voltage) conversion, so that speed signals may be generated from the pulse trains. Tachometer generators may be used to detect speeds. The feedback lines for the position signals and speed feedback loops are omitted from illustration in FIG. 3.

A spindle control circuit 71 outputs a spindle speed signal to a spindle amplifier 72 in response to a spindle rotation command and a spindle orientation command. Responsive to the spindle speed signal, the spindle amplifier 72 rotates a spindle motor 73 at a commanded speed. The orientation command positions the spindle at a desired position.

A position coder 82 is coupled to the spindle motor 73 through gears or a belt. Therefore, the position coder 82 rotates in synchronism with the spindle motor 73, and outputs feedback pulses which are read by the processor 11 through an interface 81. The feedback pulses are used to move another axis in synchronism with the spindle motor 73 for a machining process such as threading or the like.

With the present invention, as described above, since data in the form of execution blocks and modal data necessary for a preliminary processing are stored in the reverse function memory while the tool is effecting a forward travel, the NC program can be reversed or re-forwarded as desired based on the stored data.

In response to a stop command, the reverse travel or the forward travel can be stopped, the NC program can be edited, and the NC program which has been edited from the position where the travel is stopped can be executed on the basis of the modal data stored in the reverse function memory. Therefore, switching between operation modes upon editing, which has heretofore been required, is no longer necessary.

If the operator attempts to edit blocks other than those blocks which are allowed to be edited, i.e., blocks for which data in the form of execution blocks and modal data are not stored in the reverse function memory, then an alarm is produced thereby to prevent editing errors.

What is claimed is:

1. A test run control method for testing a computerized numerical control (CNC) apparatus to check a generated NC program, comprising the steps of:
   reading data block by block from an NC program in response to a test run start command, converting the data into execution blocks while forwarding a tool in a forward travel, and storing the data in the form of execution blocks and modal data necessary for a preliminary processing in a reverse function memory;
   reversing the tool in a reverse travel based on the data in the form of execution blocks stored in said reverse function memory in response to a reverse command;
   stopping said reverse travel at a given time in response to a stop command to allow said NC program to be edited in a prescribed range;
   editing the program in said prescribed range with editing means; and
   effecting the preliminary processing based on the modal data stored in said reverse function memory in response to a test run restart command, and executing the edited NC program.

2. A test run control method according to claim 1, wherein said stop command is a signal produced by a feed hold button when it is operated on, and said given time is a time when the signal is issued by said feed hold button.

3. A test run control method according to claim 1, wherein said stop command is a signal produced by a single block switch when it is operated on, and said given time is a time when the tool is reversed up to the starting point of the block in which the signal is issued by said single block switch.

4. A test run control method according to claim 1, wherein if said reverse command is stopped in a position other than the starting point of a block during said reverse travel, the tool is forwarded up to the starting point of a next block based on the data in the form of execution blocks stored in said reverse function memory, and the preliminary processing is effected on the basis of the modal data corresponding to said next block and stored in said reverse function memory, and the tool is forwarded from the starting point of said next block.

5. A test run control method according to claim 1, wherein if said reverse command is stopped at the starting point of a block during said reverse travel, the preliminary processing is effected on the basis of the modal data corresponding to said block and stored in said reverse function memory, and the tool is forwarded.

6. A test run control method according to claim 1, wherein if a command is issued to edit the program in a range other than said prescribed range with said editing means, said command is invalidated and an alarm is generated.

* * * * *